(12) United States Patent
Li et al.

(10) Patent No.: US 9,204,454 B2
(45) Date of Patent: Dec. 1, 2015

(54) INTERFERENCE COORDINATION IN WIRELESS NETWORK CLOUD ENVIRONMENT

(71) Applicant: International Business Machines Corporation, Armonk, NY (US)

(72) Inventors: Mingqiang Li, Beijing (CN); Yonghua Lin, Beijing (CN); Chao Xue, Beijing (CN); Rong Yan, Beijing (CN); Hai Zhan, Beijing (CN); Chao Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 13/778,247

(22) Filed: Feb. 27, 2013

(65) Prior Publication Data
US 2013/0225217 A1    Aug. 29, 2013

(30) Foreign Application Priority Data

Feb. 29, 2012  (CN) .......................... 2012 1 0050549

(51) Int. Cl.
*H04B 15/00*    (2006.01)
*H04W 72/08*    (2009.01)
(Continued)

(52) U.S. Cl.
CPC ............... *H04W 72/082* (2013.01); *H04L 1/20* (2013.01); *H04W 52/243* (2013.01); *H04W 52/244* (2013.01)

(58) Field of Classification Search
CPC ............ H04W 52/244; H04W 52/243; H04W 72/082; H04W 16/14
USPC ........... 455/501, 500, 517, 67.11, 561, 561.1, 455/550.1, 436–444, 422.1, 403, 426.1, 455/426.2, 412.1, 412.2, 445, 450, 509, 455/507, 508, 511, 512, 515, 524, 525; 370/252, 310, 328, 329, 331, 332, 338, 370/343

See application file for complete search history.

(56) References Cited

U.S. PATENT DOCUMENTS

2009/0252075 A1* 10/2009 Ji et al. .......................... 370/312
2010/0246483 A1    9/2010 Erceg et al.
(Continued)

FOREIGN PATENT DOCUMENTS

CN    101420746    4/2009
CN    101827383    9/2010
(Continued)

OTHER PUBLICATIONS

Samsung, Support of time domain ICIC in Rel-10, 3GPP TSG RAN WG1 Meeting #62bis Xian, China, Oct. 11-15, 2010.
(Continued)

*Primary Examiner* — Keith Ferguson
(74) *Attorney, Agent, or Firm* — Derek S. Jennings; Patent Mining Works, LLC (57) ABSTRACT

A method, system and base station for implementing interference coordination. The method includes the steps of obtaining an interference coordination object; receiving interference coordination information from an object base station, parsing the interference coordination information based on the interference coordination object, and performing interference coordination by utilizing the parsed interference coordination information. The method and base station for implementing interference coordination according to the present invention can significantly improve the spectral resource utilization and the cell edge user's performance.

17 Claims, 9 Drawing Sheets

(51) Int. Cl.
*H04L 1/20* (2006.01)
*H04W 52/24* (2009.01)

(56) References Cited

U.S. PATENT DOCUMENTS

| | | | |
|---|---|---|---|
| 2011/0003598 A1* | 1/2011 | Ma et al. .................... 455/452.1 |
| 2011/0034174 A1 | 2/2011 | Xu et al. |
| 2011/0053598 A1* | 3/2011 | Ahluwalia ..................... 455/436 |
| 2011/0105135 A1* | 5/2011 | Krishnamurthy et al. .... 455/450 |
| 2011/0182252 A1* | 7/2011 | Liu et al. ........................ 370/329 |
| 2012/0008489 A1 | 1/2012 | Higuchi et al. |
| 2012/0014333 A1 | 1/2012 | Ji |
| 2012/0082052 A1* | 4/2012 | Oteri et al. .................... 370/252 |

FOREIGN PATENT DOCUMENTS

| | | |
|---|---|---|
| CN | 102014440 | 4/2011 |
| CN | 102026390 | 4/2011 |
| CN | 102413477 | 4/2012 |
| CN | 102612087 | 7/2012 |
| WO | 2009126658 | 10/2009 |
| WO | 2011056846 | 5/2011 |

OTHER PUBLICATIONS

Nokia, TDM eICIC coordination between macro eNBs and CSG Home eNBs, 3GPP TSG RAN WG1 Meeting #62bis Xian, China, Oct. 11-15, 2010.

* cited by examiner

Fig. 10

INTERFERENCE COORDINATION IN WIRELESS NETWORK CLOUD ENVIRONMENT

CROSS-REFERENCE TO RELATED APPLICATION

The application claims priority under 35 U.S.C. §119 from Chinese Patent Application No. 201210050549.2 filed Feb. 29, 2012, the entire contents of which are incorporated herein by reference.

BACKGROUND OF THE INVENTION

With the growing demand of data traffic in wireless network, improving system throughput and spectral efficiency has become the focus of future wireless network access architecture.

Inter-base station interference coordination is a crucial technique to sufficiently achieve the potential capacity of a system. Particularly in the wireless network cloud environment with co-existence of multiple heterogeneous networks, it is of great importance for improving system spectrum efficiency to achieve interference coordination between different types of base stations. A long-term evolution (LTE) system, as an important quasi-4G system, uses overload indicator and high interference indicator (HII) to perform inter-cell interference coordination. After the LTE introduces a low-power node, it performs heterogeneous network interference coordination mainly by adopting the following three methods: multicarrier method, multicarrier-aggregation method, and co-channel method.

In the multicarrier method, different types of networks use different carriers. This method apparently wastes spectrum and is thus rather inefficient.

The multicarrier aggregation method usually reduces the interference between control channels through coordinating downlink control signaling of different cells to be transmitted over different frequency bands. In this way, a terminal supporting carrier aggregation has a higher throughput. However, it has no effect for a terminal not supporting carrier aggregation, for example, a R8 terminal. Thus, it has a poor compatibility.

Implementation of interference coordination in a co-channel condition mainly comprises time offset, almost blank subframes, and new control channel design. The time offset solution comprises OFDM symbol offset and subframe offset. The interference between control channels may be eliminated. However, the control channel and reference signals of the low-power nodes are still subjected to the interference from data channels of a macro cell, and this solution is not suitable for time division duplex (TDD) mode. The almost blank subframe solution refers to dividing all subframes of the system into regular subframes and almost blank subframes, wherein users of one network type do not send the control channel and data channel on an almost blank subframe, and users of another network type use that subframe to send the control channel and data channel. Although this solution solves the compatibility problem well, it still has relatively low resource utilization because in the almost blank subframes of a macro cell, the control information and data information of the macro cell still cannot be transmitted. Even if this solution becomes more flexible through semi-static adjustment with respect to dividing the almost blank subframes, such that the relatively low resource utilization is improved somewhat, however, the resource utilization of the system cannot be guaranteed yet due to the relatively long semi-static adjustment period.

A further solution is to design a new control channel. Because the control channel of a micro cell is subjected to the interference from a macro control channel, a new control channel may be introduced into a data subframe of the micro cell. The new control channel spans across the entire subframe temporally, but occupies less subcarriers in frequency domain. At this point, the new control channel will not be subjected to the interference from the macro cell and may flexibly use data resources of the micro cell. However, this solution needs to design a new control channel, which has a great influence on the standard.

Therefore, there is a need for a method for interference coordination that sufficiently enhances the spectral resource utilization and cell edge user's performance.

SUMMARY OF THE INVENTION

Accordingly, the present invention provides a base station communication, and more particularly, a method for implementing interference coordination between base stations.

In one aspect, of the present invention provides a method for implementing interference coordination by a base station comprising the steps of: obtaining an interference coordination object; receiving interference coordination information from an object base station; parsing the interference coordination information based on the interference coordination object; and performing the interference coordination by utilizing the parsed interference coordination information.

Another aspect of the present invention provides a base station for implementing interference coordination, comprising: a memory; a processor communicatively coupled to the memory; and a interference coordination selection module configured to perform the steps of a method comprising: obtaining module configured to obtain an interference coordination object; receiving interference coordination information from an object base station; parsing module configured to parse the interference coordination information based on the interference coordination object; and performing interference coordination by utilizing the parsed interference coordination information.

DETAILED DESCRIPTION OF THE PREFERRED EMBODIMENTS

Preferred embodiments will be described in more detail with reference to the accompanying drawings, in which the embodiments of the present disclosure have been illustrated. However, it should be understood that the present disclosure can be implemented in various manners and thus should not be construed to be limited to the embodiments disclosed herein. On the contrary, these embodiments have been provided to support thorough and complete understanding of the present invention.

Figure 1:
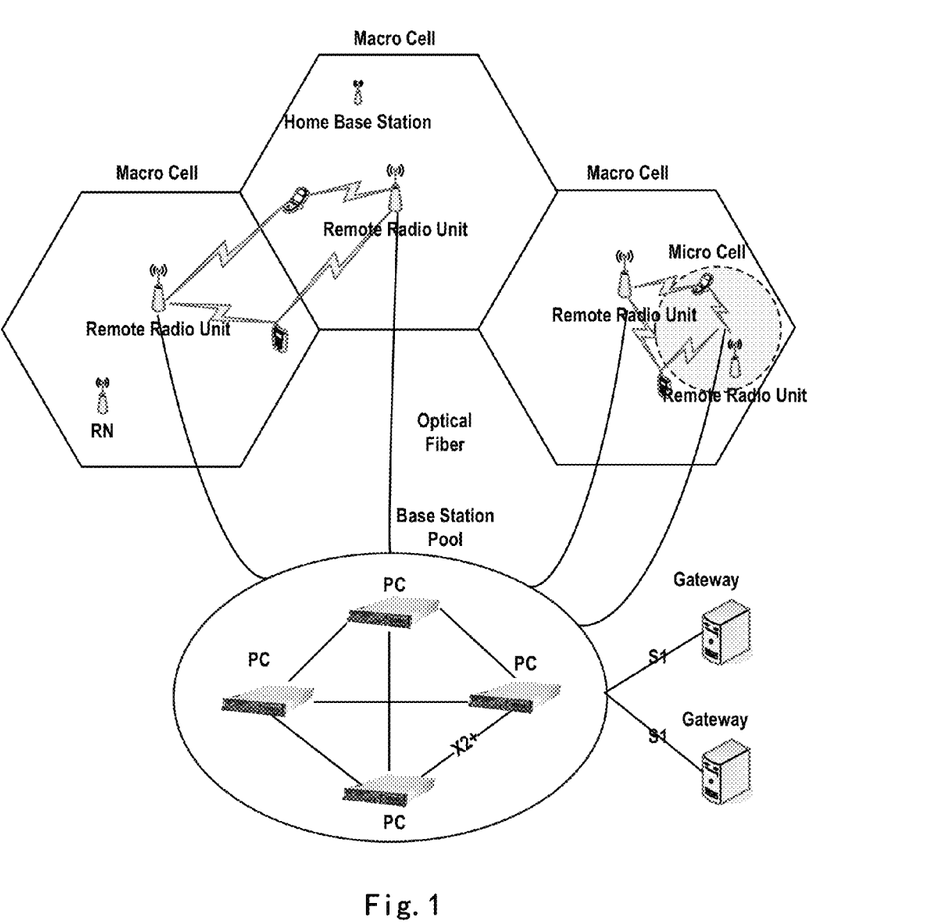
FIG. 1 illustrates a structural diagram of a wireless network cloud with co-existence of multiple heterogeneous networks according to an embodiment of the present invention.
Figure 2:
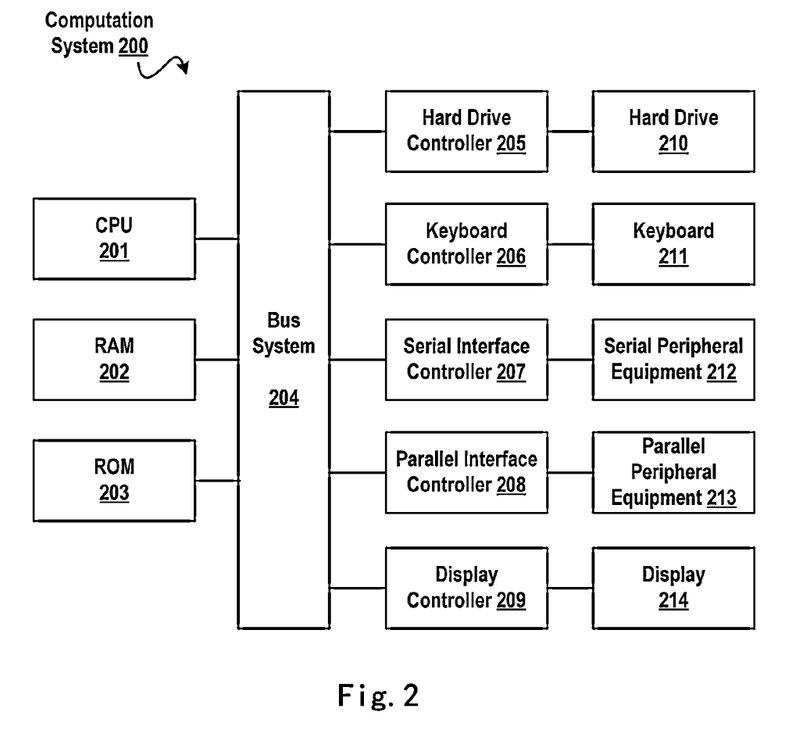
FIG. 2 illustrates a block diagram of an exemplary computation system 200 which is applicable to implement the embodiments of the present invention.

FIG. 2 illustrates an exemplary computer system 200 which is applicable to implement the embodiments of the present invention. As illustrated in FIG. 2, the computer system 200 can include: CPU (Central Processing Unit) 201, RAM (Random Access Memory) 202, ROM (Read Only Memory) 203, System Bus 204, Hard Drive Controller 205, Keyboard Controller 206, Serial Interface Controller 207, Parallel Interface Controller 208, Display Controller 209, Hard Drive 210, Keyboard 211, Serial Peripheral Equipment 212, Parallel Peripheral Equipment 213 and Display 214. Among above devices, CPU 201, RAM 202, ROM 203, Hard Drive Controller 205, Keyboard Controller 206, Serial Interface Controller 207, Parallel Interface Controller 208 and Display Controller 209 are coupled to the System Bus 204. Hard Drive 210 is coupled to Hard Drive Controller 205. Keyboard 211 is coupled to Keyboard Controller 206. Serial Peripheral Equipment 212 is coupled to Serial Interface Controller 207. Parallel Peripheral Equipment 213 is coupled to Parallel Interface Controller 208. And, Display 214 is coupled to Display Controller 209. It should be understood that the structure as illustrated in FIG. 2 is only for the exemplary purpose rather than any limitation to the scope of the present invention. In some cases, some devices can be added to or removed from the computer system 200 based on specific situations.

As will be appreciated by one skilled in the art, aspects of the present invention can be embodied as a system, method or computer program product. Accordingly, aspects of the present disclosure can take the form of an entirely hardware embodiment, an entirely software embodiment (including firmware, resident software, micro-code, etc.) or one embodiment combining software and hardware aspects that can all generally be referred to herein as a "circuit," "module" or "system." Furthermore, in some embodiments, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
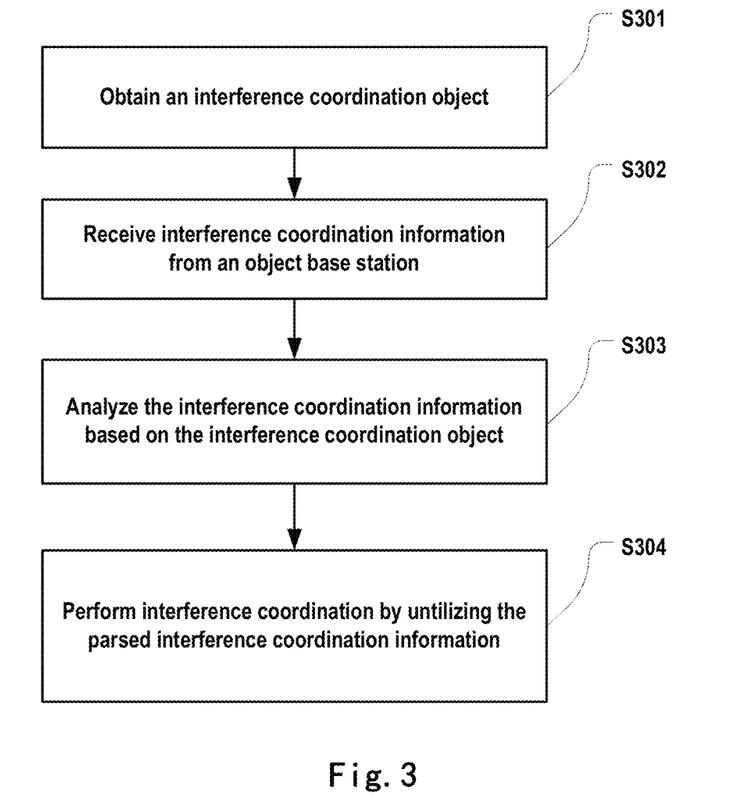
FIG. 3 illustrates a method for implementing interference coordination by a base station according to an embodiment of the present invention.

With reference now to FIG. 3, it illustrates an interference coordination method according to one embodiment of the present invention, wherein the base station performs the following steps: at step S301, obtaining an interference coordination object; at step S302, receiving interference coordination information from an object base station; at step S303, parsing the interference coordination information based on the interference coordination object; and performing interference coordination with the parsed interference coordination information in step S304.

According to the embodiments of the present invention, the interference coordination object has four types, which are interference coordination between a at least two macro cells in downlink, interference coordination between at least two macro cells in uplink, interference coordination between a macro cell and a micro cell in uplink, and interference coordination between a macro cell and a micro cell in downlink, respectively.

According to one embodiment of the present invention, an indifference coordination object as obtained is the interference coordination between at least two macro cells in downlink. The current base station is a macro base station, and the object base station is a macro base station. The current macro base station obtains interference coordination information from the object macro base station. The object macro base station generates the interference coordination information with Resource Blocks (RB) as basic granularity and the number of obtained RBs is related to the system bandwidth, wherein the interference coordination information includes power information of the RBs, cell edge information of users occupying the RBs, and channel quality information of the RBs.

Herein, the object macro base station obtains the power information of each RB from a scheduling module, divides the RBs into high power RBs or low power RBs according to a predetermined rule, obtains the cell edge information of the RBs from a measuring module, and obtains the channel quality information from user feedback. Likewise, transmitting and receiving of the interference coordination information is bidirectional between the macro base stations, and the current macro base station can also generate the interference coordination information and transmit it to the object macro base station for interference coordination. Table 1 below illustrates the interference coordination information received by the macro base station from the object macro base station according to one embodiment of the present invention, wherein the power of RB1 is "high," the cell edge information "No" indicates that it is located in the cell center and therefore, it would be unnecessary to record channel quality, and thus the channel quality information is blank. In Table 1, the power of RB2 being "high" and the cell edge information being "Yes" indicate that it is located at cell edge, and the channel quality information H represents a specific channel vector or matrix.

TABLE 1

| RB | Power | Cell Edge Information | Channel Quality Information |
|---|---|---|---|
| 1 | High | No | |
| 2 | High | Yes | H |
| ... | | | |
| N | Low | No | |

According to an embodiment of the present invention, the cell edge information can also be implemented by coding. In addition to differentiating whether the current user is an edge user or a non-edge user, encoding the location of the current user can further differentiate to which cell an edge user is adjacent in the case of the edge user.

The current macro base station parses from the interference coordination information the power information of the RBs, the cell edge information of the user occupying the RBs, and the channel quality information of the RBs. According to an embodiment of the present invention, allocation priorities of RBs are generated based on the power information of the RBs, for allocating the RBs to the current user.

According to an embodiment of the present invention, if it is determined that the current user is a cell edge user, the allocation priorities of RBs from high to low are: non-interference RBs, low power RBs, and high power RBs, respectively. High power is allocated to the current user, if it is determined that the current user must use a high-power RB, then power control is performed. The user using the high power RB and the current user are subjected to joint beamforming to eliminate interference.

According to an embodiment of the present invention, if it is determined that the current user is a non-cell-edge user and it is unnecessary to allocate high power to the current user, then a non-interference RB is preferentially allocated to the current user.

According to an embodiment of the present invention, if it is determined that the current user is a non-cell-edge user and it is necessary to allocate high power to the current user, then the allocation priorities of RBs from high to low are: non-interference RBs, non-cell-edge RBs, and cell edge RBs.

Figure 4:
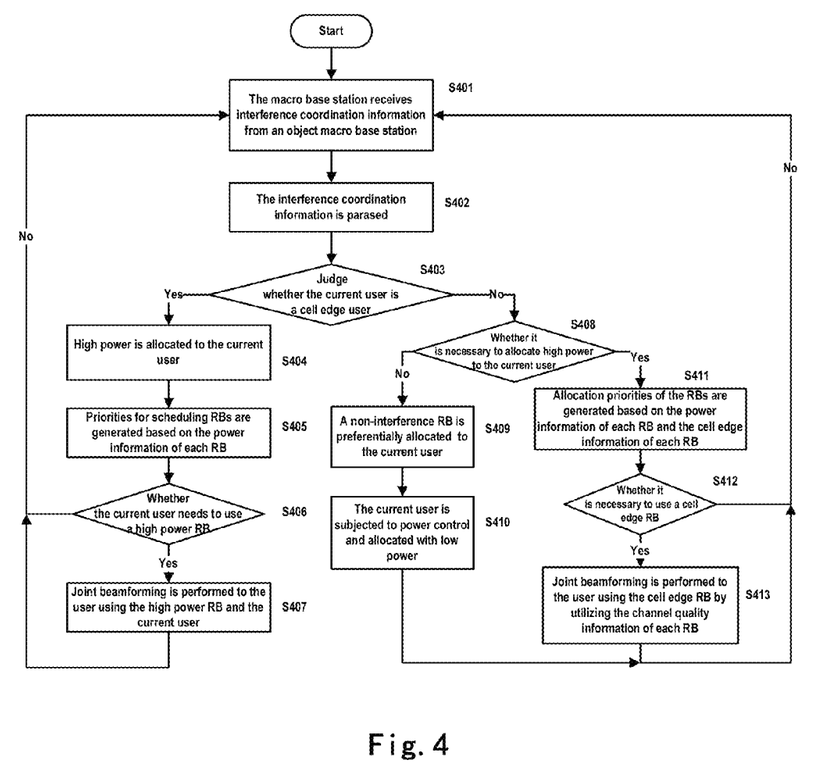
FIG. 4 illustrates a procedure of interference coordination between at least two macro cells in downlink according to an embodiment of the present invention.

FIG. 4 illustrates a procedure of interference coordination between a at least two macro cells in downlink according to one embodiment of the present invention. First, in step S401, a macro base station receives interference coordination information from an object macro base station. Then in step S402, interference coordination information is parsed to obtain power information of RBs, cell edge information of users occupying the RBs, and channel quality information of the RBs. Next, in step S403, it is judged whether the scheduled current user is a cell edge user and if the judgment result is "Yes," then power control is performed, and high power is allocated to the current user in step S404. Next, in step S405, allocation priorities of RBs are generated based on the power information of the RBs, for allocating a RB to the current user, wherein the order of the allocation priorities of RBs from high to low are non-interference RBs, low power RBs, and high power RBs.

Following that, in step S406, it is judged whether the current user must use a high power RB and if the judgment result is "No," then the procedure returns to step S401 to receive interference coordination information from the object macro base station in the next cycle. If the judgment result is "Yes," then the user using the high power RB and the current user are subjected to joint beamforming to eliminate interference, and then the current cycle ends and the procedure then returns to step S401 to receive the interference coordination information from the object macro base station in the next cycle (step S407).

If the judgment result at step S403 is "No," i.e., the user is a non-cell-edge user, then it is judged whether it is necessary to allocated high power to the current user (step S408). If the judgment result is "No," then a non-interference RB is preferentially allocated to the current user (step S409). Because the current user is a non-cell-edge user, a user allocated with high power or low power would not interfere with the current user too much, thus the high power RBs and low power RBs have the same allocation priority. In step S410, the current user is subjected to power control and allocated with low power, and then the current cycle ends and the procedure returns to step S401 so as to receive the interference coordination information from the object macro base station in the next cycle.

If the judgment result at step S408 is "Yes," based on the power information of the RBs and the cell edge information of the RBs, the priorities for allocating RBs are generated and ranked in an order from high to low as: non-interference RBs, non-cell-edge RBs, and cell edge RBs (step S411). In step S412, it is judged whether it is necessary to use a cell edge RB. In order to do this, the use information of the RB is obtained from a scheduler, and in conjunction with the interference coordination information, it is judged whether it is necessary to use the cell edge RB.

If the judgment result is "No," then the procedure returns to step S401 so as to receive the interference coordination information from the object macro base station in the next cycle. if the judgment result is "Yes,", then in step S413, performing joint beamforming to the user using the cell edge RB and the current user by utilizing the channel quality information of the RBs so as to eliminate the interference. Then the current cycle ends, and the procedure returns to step S401 for receiving the interference coordination information from the object macro base station in the next cycle (step S413).

According to an embodiment of the present invention, the obtained interference coordination object information is the interference coordination information between at least two macro cells in uplink. The current base station is a macro base station, and the object base station is a macro base station. The current macro base station obtains the interference coordination information from the object macro base station. The object macro base station generates interference coordination information with Resource Blocks (RB) as basic granularity. The number of obtained RBs is related to the system bandwidth, wherein the interference coordination object information includes signal to interference plus noise ratios of RBs and cell edge information of users occupying the RBs, wherein the signal to interference plus noise ratios of RBs and cell edge information of users occupying the RBs are obtained from a measuring module. Similarly, transmitting and receiving of the interference coordination information is bidirectional between the macro base stations, and the current macro base station would also generate the interference coordination information and transmit it to the object macro base station to perform interference coordination.

Table 2 below illustrates the interference coordination information according to one embodiment of the present invention, wherein the signal to interference plus noise ratio of RB1 is 1 dB, and the cell edge information of the user occupying the RB is "No," which indicates that the user occupying the RB is a non-cell-edge user. The signal to interference plus noise ratio of RB2 is 10 dB, and the cell edge information of the user occupying the RB is "Yes," which indicates that the user occupying the RB is a cell edge user.

TABLE 2

| RB | Signal to Interference Plus Noise Ratio | Cell Edge Information |
| --- | --- | --- |
| 1 | 1 dB | No |
| 2 | 10 dB | Yes |
| ... | | |
| N | 20 dB | No |

Figure 5:
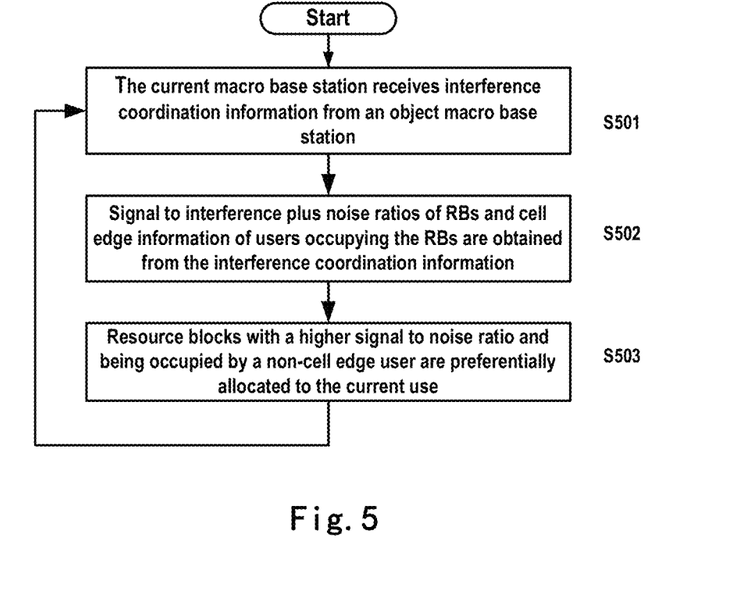
FIG. 5 illustrates a procedure of interference coordination between at least two macro cells in uplink according to an embodiment of the present invention.

FIG. 5 illustrates a procedure of interference coordination between at least two macro cells in uplink according to one embodiment of the present invention. In step S501, the current macro base station receives interference coordination information from an object macro base station. Then, in step S502, the interference coordination information is parsed to obtain signal to interference plus noise ratios of RBs and cell edge information of users occupying the RBs. Following that, in step S503, allocation priorities of the RBs are generated, and resource blocks with a higher signal to interference plus noise ratio and being occupied by a non-cell-edge user are preferentially allocated to the current user. Then the cycle ends and the procedure returns to step S501 for receiving the interference coordination information from the object macro base station in the next cycle (step S503).

According to an embodiment of the present invention, the obtained interference coordination object information is the interference coordination between a macro cell and a micro cell in downlink. The current base station is a micro base station, and the object base station is a macro base station. The current micro base station obtains the interference coordination information from the object macro base station. The object macro base station generates interference coordination information with subframes as basic granularity. One subframe relates to 1 ms. Power information of a plurality of subframes is obtained, for example, power information of one frame (one frame includes 10 subframes), wherein the power of each subframe is classified into high or low. It should be noted that low power and high power subframes are defined relative to macro cells, and for micro cells, each subframe is transmitted with full power.

Figure 6:
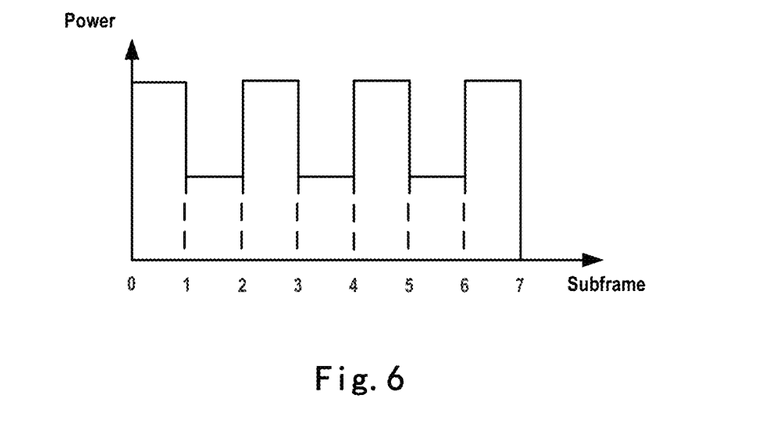
FIG. 6 illustrates subframe power information received by a micro base station from an object macro cell according to an embodiment of the present invention.

FIG. 6 illustrates the subframe power information received by a micro base station from an object macro base station according to an embodiment of the present invention, from which the information about high power subframes and low power subframes can be obtained. Performing interference coordination by the micro cell by utilizing the parsed interference coordination information includes transmitting control information and data information of a micro cell user in low power subframes of the macro cell based on the obtained subframe power information.

According to an embodiment of the present invention, the obtained interference object coordination information is the interference coordination between a macro cell and a micro cell in downlink. The current base station is a macro base station, and the object base station is a micro base station. The macro base station receives the interference coordination information from the micro base station, wherein the interference coordination information generated by the micro base station includes load condition of the micro cell, and RB occupying condition of the micro cell in low power subframes of the macro cell.

The micro base station collects the load condition and transmitting the load information to the macro base station, and the macro base station adjusts a low power ratio of the macro cell in a plurality of subframes based on the received load information and divides the plurality of subframes into low power subframes and high power subframes based on the low power ratio, thereby obtaining the interference coordination information with subframes as basic granularity and transmitting the subframe power information to the micro base station.

In this embodiment, performing interference coordination by the macro base station by utilizing the parsed interference coordination information includes transmitting control information and data information of a macro cell user in high power subframes of the macro cell based on the load condition of the micro cell, and transmitting data information of the macro cell user in low power subframes of the macro cell based on the RB occupying condition of the micro cell in low power subframes of the macro cell.

Figure 7:
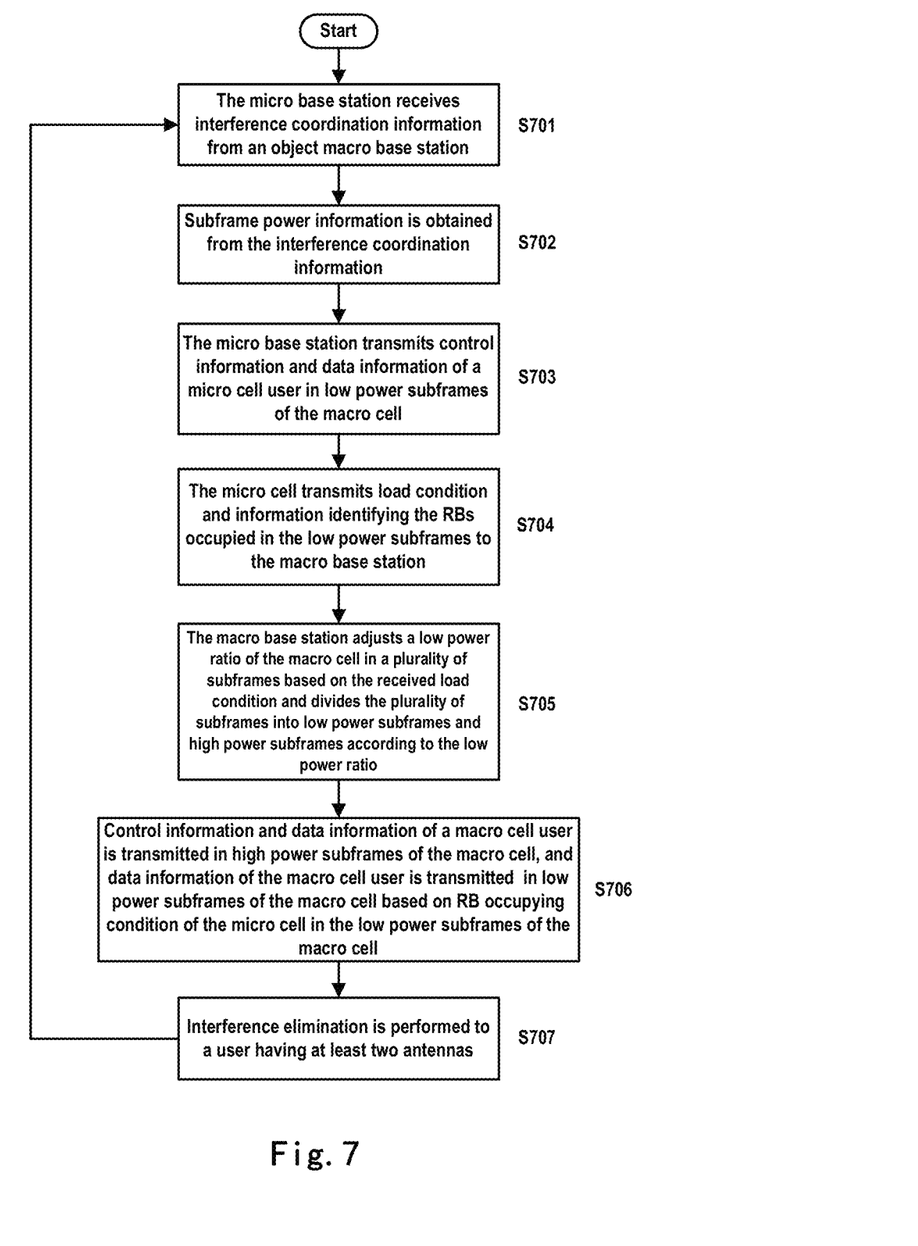
FIG. 7 illustrates a procedure of interference coordination between a macro cell and a micro cell in downlink according to an embodiment of the present invention.

FIG. 7 illustrates a procedure of interference coordination between a macro cell and a micro cell in downlink according to an embodiment of the present invention. In step S701, a micro base station receives interference coordination information from an object macro base station. After receiving the interference coordination information, subframe power information is obtained from the interference coordination information (step S702). Then, in step S703, the micro base station transmits control information and data information of a micro cell user in low power subframes of the macro cell. Following the transmission, the micro cell transmits the load condition and the information identifying the RBs occupied in the low power subframes to the macro base station (step S704). Next, in step S705, the macro base station adjusts a low power ratio of the macro cell in a plurality of subframes based on the received load condition and divides the plurality of subframes into low power subframes and high power subframes according to the low power ratio, thereby obtaining the interference coordination information with subframes as basic granularity.

After obtaining the interference coordination, the macro base station receives the information identifying the RBs occupied by the micro cell in the low power subframes, transmits control information and data information of a macro cell user in high power subframes of the macro cell, and transmits data information of the macro cell user in low power subframes of the macro cell based on the RB occupying condition of the micro cell in the low power subframes of the macro cell (step S706).

This allocates the data information to other RBs than the RBs occupied by the micro cell in the low power subframes (step S706). In step S707, interference elimination is performed for a user having at least two antennas so as to improve performance; then the current cycle ends, and the procedure returns to step S701 for receiving the interference coordination information from the object macro base station in the next cycle.

According to one embodiment of the present invention, the obtained interference coordination object information is the interference coordination between a macro cell and a micro cell in uplink. The current base station is a micro base station, and the object base station is a macro base station. The current micro base station obtains the interference coordination information from the object macro base station. The object macro base station generates interference coordination information with subframes as basic granularity. One subframe relates to 1 ms. Power information of a plurality of subframes is obtained, for example the power information of one frame (where one frame includes 10 subframes), wherein each subframe is classified into silence subframe or non-silence subframe.

Figure 8:
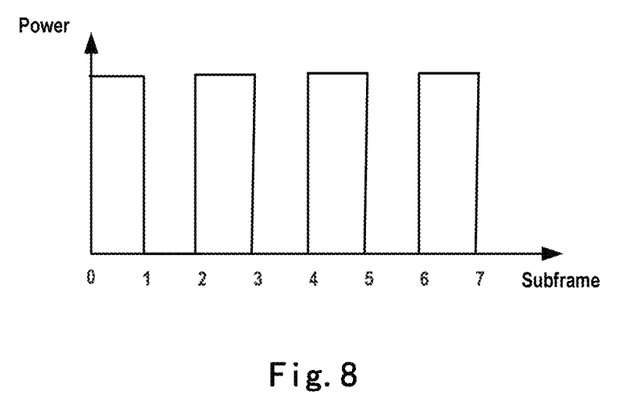
FIG. 8 illustrates subframe power information received by a micro base station from an object macro cell according to an embodiment of the present invention.

The macro base station collects load condition, adjusts a silence subframe ratio of the micro cell in a plurality of subframes, divides the plurality of subframes into silence subframes and non-silence subframes according to the silence subframe ratio, and transmits the interference coordination information to the micro base station. The silence subframes and non-silence subframes are defined relative to the micro cell, since the macro cell can transmit information in each subframe. FIG. 8 illustrates the subframe power information received by a micro base station from an object macro base station according to an embodiment of the present invention, from which the information about silence subframes and non-silence subframes can be obtained. Herein, performing interference coordination by the micro cell by utilizing the parsed interference coordination information includes transmitting control information and data information of a micro cell user in the non-silence subframes of the micro cell.

According to one embodiment of the present invention, the obtained interference coordination object information is the interference coordination between a macro cell and a micro cell in downlink. The current base station is a macro base station, and the object base station is a micro base station, wherein the interference coordination information generated by the micro base station includes load condition of the micro cell and RB occupying condition of the micro cell in non-silence subframes.

The micro base station collects the load condition and transmitting the load information to the macro base station, and the macro base station adjusts a silence subframe ratio of the micro cell in a plurality of subframes based on the received load information and divides the plurality of subframes into silence subframes and non-silence subframes, thereby obtaining the interference coordination information with subframes as basic granularity and transmitting the interference coordination information to the micro base station.

Herein, performing interference coordination by the macro base station by utilizing the parsed interference coordination information includes transmitting control information and data information of edge users and non-edge users of the macro cell in the silence subframes of the micro cell based on the load condition of the micro cell, transmitting the control information and the data information of the non-edge users of the macro cell in the non-silence subframes of the micro cell based on the RB occupying condition of the micro cell in non-silence subframes.

Figure 9:
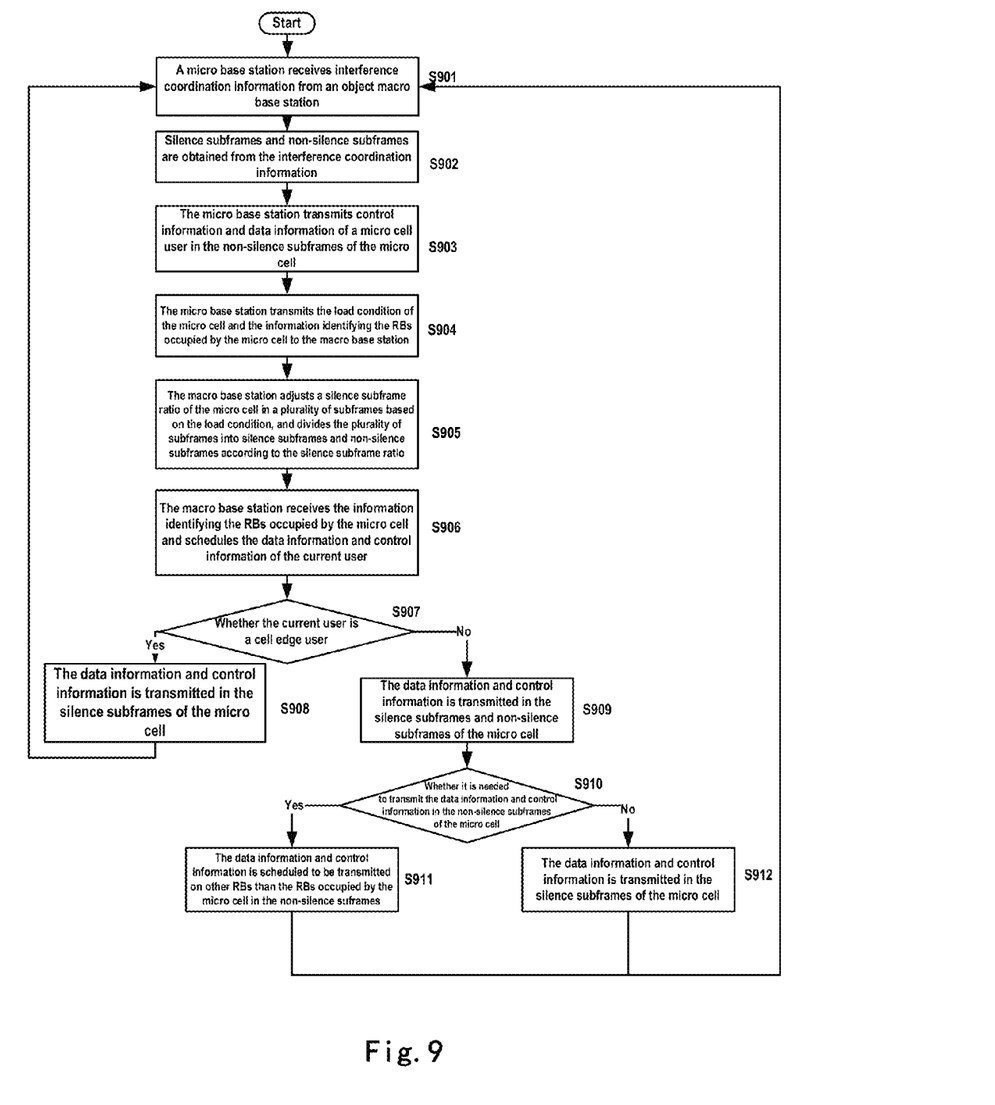
FIG. 9 illustrates a procedure of interference coordination between a macro cell and a micro cell in uplink according to an embodiment of the present invention.

FIG. 9 illustrates a procedure of interference coordination between a macro cell and a micro cell in uplink according to one embodiment of the present invention. In step S901, a micro base station receives interference coordination information from an object macro base station. In step S902, the interference coordination information is parsed to obtain silence subframes and non-silence subframes. Then in step S903, the micro base station transmits control information and data information of a micro cell user in the non-silence subframes of the micro cell Next, in step S904, the micro base station transmits the load condition of the micro cell and the information identifying the RBs occupied by the micro cell to the macro base station After the transmission, the macro base station adjusts a silence subframe ratio of the micro cell in a plurality of subframes based on the load condition, and divides the plurality of subframes into silence subframes and non-silence subframes according to the silence subframe ratio (step S905). Then, in step S906, the macro base station receives the information identifying the RBs occupied by the micro cell and schedule the data information and control information of the current user. Subsequently in step S907, it is judged whether the current user is a cell edge user of the macro cell and if the judgment result is "Yes," then in step S908, the data information and control information of the current user is transmitted in the silence subframes of the micro cell. At this point, the current cycle ends, and the procedure returns to step S901 for receiving the interference coordination information from the object macro base station in the next cycle.

If the judgment result is "No," then the data information and control information of the current user is transmitted in the silence subframes and non-silence subframes of the micro cell. Then, in step S910, it is judged whether it is needed to transmit the data information and control information of the current user in the non-silence subframes of the micro cell and if the judgment result is "Yes," then in step S911, the data information and control information is scheduled to be transmitted on other RBs than the RBs occupied by the micro cell in the non-silence subframes of the micro cell, then the current cycle ends. At this point, the procedure returns to step S901 for receiving the interference coordination information from the object macro base station in the next cycle.

If the judgment result is "No," then at step S912, the data information and control information of the current user is transmitted in the silence subframes of the micro cell, and the current cycle ends, and the procedure returns to step S901 for receiving the interference coordination information from the object macro base station in the next cycle.

Figure 10:
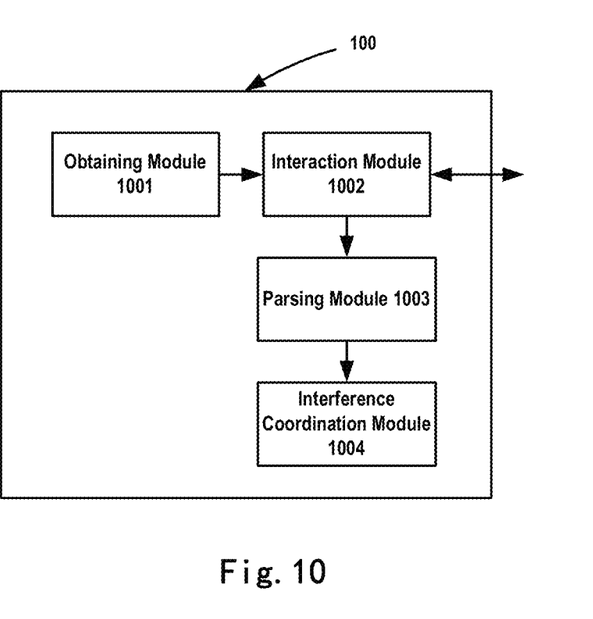
FIG. 10 illustrates a block diagram of a base station for implementing interference coordination according to an embodiment of the present invention.

Based on the same inventive concept, the present invention provides a base station for implementing interference coordination. FIG. 10 illustrates a base station 100 for implementing interference coordination according to an embodiment of the present invention, the base station includes an obtaining module 1001 configured to obtain an interference coordination object, an interaction module 1002 configured to receive interference coordination information from an object base station, a parsing module 1003 configured to parse the interference coordination information based on the interference coordination object, and an interference coordination module 1004 configured to perform interference coordination by utilizing the parsed interference coordination information. Herein, the interaction module 1002 is further configured to generate the interference coordination information and transmit it to the object base station.

According to an embodiment of the present invention, the interference coordination object is the interference coordination between at least two macro cells in downlink, and the parsed interference coordination information includes: power information of resource blocks, cell edge information of the resource blocks, and channel quality information of the resource blocks.

According to an embodiment of the present invention, the interference coordination module is configured to generate allocation priorities of resource blocks based on the power information of the resource blocks.

According to an embodiment of the present invention, the interference coordination module is configured to allocate high power to a current user if it is determined that the current user is a cell edge user. The allocation priorities of resource blocks from high to low are determined to be: non-interference resource blocks, low power resource blocks, and high power resource blocks. If it is necessary to allocate high power resource blocks to the current user, then the user using the high power resource blocks and the current user are subjected to joint beamforming.

According to an embodiment of the present invention, the interference coordination module is configured such that if it is determined that the current user is a non-cell-edge user and it is necessary to allocate high power to the current user, then the allocation priorities of resource blocks from high to low are: non-interference resource blocks, non-cell-edge resource blocks, and cell edge resource blocks.

According to an embodiment of the present invention, the interference coordination object is the interference coordination between at least two macro cells in uplink, and the parsed interference coordination information includes a signal to interference plus noise ratio of the resource blocks and the cell edge information of the user occupying the resource blocks.

According to an embodiment of the present invention, the interference coordination module is configured to: preferentially allocate the resource blocks with a higher signal to noise ratio and being occupied by a non-cell-edge user to the current user.

According to an embodiment of the present invention, the base station is a micro base station, the object base station is a macro base station, and the interference coordination object is the interference coordination between a micro cell and a macro cell in downlink. The parsed interference coordination information includes subframe power information, wherein the interference coordination module is configured to transmit control information and data information of a micro cell user in low power subframes of the macro cell.

According to an embodiment of the present invention, the base station is a macro base station, the object base station is a micro base station, and the parsed interference coordination information includes load condition of the micro cell and resource block occupying condition of the micro cell in the low power subframes of the macro cell, wherein the interference coordination module is configured to: transmit control information and data information of a macro cell user in high power subframes of the macro cell according to the load condition of the micro cell, and transmit data information of the macro cell user in low power subframes of the macro cell based on the resource block occupying condition of the micro cell in the low power subframes of the macro cell.

According to an embodiment of the present invention, the base station is a micro base station, the object base station is a macro base station, and the interference coordination object is the interference coordination between a micro cell and a macro cell in uplink. The parsed interference coordination information includes silence subframes and non-silence subframes of the micro cell, wherein the interference coordination module is configured to transmit control information and data information of a micro cell user in the non-silence subframes of the micro cell.

According to an embodiment of the present invention, the base station is a macro base station, the object base station is a micro base station, the interference coordination object is the interference coordination between a micro cell and a macro cell in uplink, and the parsed interference coordination information includes load condition of the micro cell and resource block occupying condition of the micro cell in non-silence subframes. The interference coordination module is configured to transmit control information and data information of edge users and non-edge users of the macro cell in silence subframes of the micro cell based on the load condition of the micro cell, and transmit control information and data information of non-edge users of the macro cell in the non-silence subframes of the micro cell based on the resource block occupying condition of the micro cell in the non-silence subframes.

The base station for implementing interference coordination according to the embodiments of the present invention can be implemented by a generic computer system as illustrated in FIG. 2. A plurality of generic computer systems forms a base station pool in a wireless network cloud. By using the method and base station for implementing interference coordination according to the embodiments of the present invention, it can sufficiently improve the spectral resource utilization and the performance of a cell edge user, thereby enhancing the coverage of heterogeneous networks and improving the resource utilization of the heterogeneous networks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures.

For example, two blocks illustrated in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for implementing interference coordination by a base station, the method comprising the steps of:
    obtaining an interference coordination object;
    receiving interference coordination information from an object base station;
    parsing the interference coordination information based on the interference coordination object; and
    performing the interference coordination by utilizing the parsed interference coordination information, wherein performing the interference coordination by utilizing the parsed interference coordination information comprises the step of:
    generating allocation priorities of resource blocks to a current user based on power information of the resource blocks, wherein the interference coordination object is between macro cells in uplink, and the parsed interference coordination information comprises a signal to interference plus noise ratio of the resource blocks and cell edge information of users occupying the resource blocks and wherein performing interference coordination by utilizing the parsed interference coordination information comprises the step of allocating to the current user the resource blocks with a higher signal to noise ratio and being occupied by a non-cell-edge user.

2. The method according to claim 1, wherein the base station further performs the step comprising of:
    generating the interference coordination information; and
    transmitting it to the object base station.

3. The method according to claim 1, wherein the interference coordination object is the interference coordination between at least two macro cells in downlink.

4. The method according to claim 1, wherein generating the allocation priorities of the resource blocks based on the power information of the resource blocks comprises the steps of:
    allocating high power to the current user if the current user is determined to be a cell edge user; and
    determining the allocation priorities of the resource blocks from high to low to be: non-interference resource blocks, low power resource blocks, and high power resource blocks.

5. The method according to claim 4, wherein generating the allocation priorities of the resource blocks based on the power information of the resource blocks comprises the steps of:
    assessing the necessity of allocating the high power resource blocks to the current user; and
    performing joint beamforming to a user using the high power resource blocks.

6. The method according to claim 1, wherein generating the allocation priorities of the resource blocks based on the power information of the resource blocks comprises the steps of:
    determining if the current user is a non-cell-edge user;
    if it is necessary to allocate high power to the current user; and
    determining the allocation priorities of the resource blocks from high to low to be comprising: the non-interference resource blocks, the resource blocks occupied by the non-cell-edge user, and the resource blocks occupied by a cell edge user.

7. The method according to claim 1, wherein the base station is a micro base station, the object base station is a macro base station, the interference coordination object is interference coordination between the macro cells in downlink, and the parsed interference coordination information comprises subframe power information.

8. The method according to claim 7, wherein performing interference coordination by utilizing the parsed interference coordination information comprises the step of:
    transmitting control information and data information of a micro cell user in low power subframes of the macro cell.

9. The method according to claim 8, wherein the base station is a macro base station, the object base station is a micro base station, and the parsed interference coordination information comprises load condition of the micro cell, and resource block occupying condition of the micro cell in the low power subframe of the macro cell.

10. The method according to claim 9, wherein performing the interference coordination by utilizing the parsed interference coordination information comprises the steps of:
    transmitting control information and data information of a macro cell user in high power subframes of the macro cell based on the load condition of the micro cell; and
    transmitting said data information of the macro cell user in the low power subframes of the macro cell based on the resource block occupying condition of the micro cell in the low power subframe of the macro cell.

11. The method according to claim 1, wherein the base station is a micro base station, the object base station is a macro base station, the interference coordination object is interference coordination between a micro cell and a macro cell in uplink, and the parsed interference coordination information comprises silence subframes and non-silence subframes of the micro cell.

12. The method according to claim 11, wherein performing interference coordination by utilizing the parsed interference coordination information comprises:

transmitting control information and data information of a micro cell user in the non-silence subframes of the micro cell.

13. The method according to claim 12, wherein the parsed interference coordination information comprises load condition of the micro cell and resource block occupying condition of the micro cell in the non-silence subframes.

14. The method according to claim 13, wherein performing interference coordination by utilizing the parsed interference coordination information comprises the steps of:

transmitting control information and data information of edge users and non-edge users of the macro cell in the silence subframes of the micro cell based on the load condition of the micro cell; and transmitting the control information and the data information of the non-edge users of the macro cell in the non-silence subframes of the micro cell based on the resource block occupying condition of the micro cell in the non-silence subframes.

15. The method according to claim 1 further comprising:

transmitting the interference coordination to the object base station.

16. A base station for implementing interference coordination, comprising:

a memory;

a processor communicatively coupled to the memory; and a interference coordination selection module configured to perform the steps of a method comprising:

obtaining module configured to obtain an interference coordination object;

receiving interference coordination information from an object base station;

parsing module configured to parse the interference coordination information based on the interference coordination object; and performing interference coordination by utilizing the parsed interference coordination information, wherein performing the parsed interference coordination information comprises the step of:

generating allocation priorities of resource blocks to a current user based on power information of the resource blocks, and wherein the interference coordination object is between macro cells in uplink, and the parsed interference coordination information comprises a signal to interference plus noise ratio of the resource blocks and cell edge information of users occupying the resource blocks and wherein performing interference coordination by utilizing the parsed interference coordination information comprises the step of allocating to the current user the resource blocks with a higher signal to noise ratio and being occupied by a non-cell-edge user.

17. The base station according to claim 16, wherein the interaction module is further configured to generate the interference coordination information and transmit it to the object base station.

* * * * *